(12) United States Patent
Schindlbeck (10) Patent No.: US 11,932,054 B2
(45) Date of Patent: Mar. 19, 2024

(54) WHEEL FOR A VEHICLE

(71) Applicant: Bayerische Motoren Werke Aktiengesellschaft, Munich (DE)

(72) Inventor: Martin Schindlbeck, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 858 days.

(21) Appl. No.: 16/979,411

(22) PCT Filed: Feb. 6, 2019

(86) PCT No.: PCT/EP2019/052862
§ 371 (c)(1),
(2) Date: Sep. 9, 2020

(87) PCT Pub. No.: WO2019/174820
PCT Pub. Date: Sep. 19, 2019

(65) Prior Publication Data
US 2021/0078362 A1    Mar. 18, 2021

(30) Foreign Application Priority Data

Mar. 13, 2018 (DE) ...................... 10 2018 203 801.5

(51) Int. Cl.
*B60B 7/02* (2006.01)
*B32B 37/06* (2006.01)
(Continued)

(52) U.S. Cl.
CPC ................ *B60B 7/02* (2013.01); *B32B 37/06* (2013.01); *B32B 37/10* (2013.01);
(Continued)

(58) Field of Classification Search
CPC .... B60B 7/02; B60B 7/04; B60B 7/06; B60B 7/061; B60B 7/065; B60B 7/08;
(Continued)

(56) References Cited

U.S. PATENT DOCUMENTS 4,593,953 A * 6/1986 Baba .......................... B60B 7/00
                                                                 301/6.3
5,772,946 A    6/1998 Kaminaga et al.
(Continued)

FOREIGN PATENT DOCUMENTS

CN    102887034 A    1/2013
CN    105246707 A    1/2016
(Continued)

OTHER PUBLICATIONS

Chinese-language Office Action issued in Chinese Application No. 201980018577.6 dated Jun. 23, 2022 with English translation (16 pages).
(Continued)

*Primary Examiner* — Kip T Kotter
(74) *Attorney, Agent, or Firm* — Crowell & Moring LLP (57) ABSTRACT

A wheel of a vehicle has a rim, a hub portion and at least two spokes connecting the hub portion to the rim. At least one spoke intermediate space between the spokes is at least partially covered by a single-piece cover element. A wing portion of the cover element is deformed axially away from the wheel when heat is supplied. The cover element is connected directly to the wheel, and the single-piece cover element is formed from a single material.

12 Claims, 2 Drawing Sheets

(51) Int. Cl.
  *B32B 37/10* (2006.01)
  *B32B 38/18* (2006.01)
  *B60B 1/06* (2006.01)
  *B60B 7/06* (2006.01)
  *B60B 7/08* (2006.01)
(52) U.S. Cl.
  CPC ............ *B32B 38/1808* (2013.01); *B60B 1/06* (2013.01); *B60B 7/061* (2013.01); *B60B 7/08* (2013.01); *B32B 2605/00* (2013.01); *B60B 2310/242* (2013.01); *B60B 2310/616* (2013.01); *B60B 2360/341* (2013.01); *B60B 2900/513* (2013.01)
(58) Field of Classification Search
  CPC ... B60B 7/0086; B60B 1/06; B60B 2310/242; B60B 2310/616; B60B 2360/341; B32B 37/06; B32B 37/10; B32B 38/1808; B32B 2605/00; B32B 5/12; B32B 5/027; B32B 5/028; B32B 2260/023; B32B 2262/106
  See application file for complete search history.

(56) References Cited

U.S. PATENT DOCUMENTS

| | | | | |
|---|---|---|---|---|
| 6,439,670 | B1 * | 8/2002 | Winters | B60B 7/08 301/37.101 |
| 2011/0094217 | A1 * | 4/2011 | Chen | B32B 5/02 428/221 |
| 2012/0013170 | A1 * | 1/2012 | Renius | B60B 7/00 301/37.102 |
| 2012/0256473 | A1 | 10/2012 | Schmid et al. | |
| 2013/0020856 | A1 | 1/2013 | Dick et al. | |
| 2013/0049440 | A1 | 2/2013 | Morse et al. | |
| 2016/0096398 | A1 | 4/2016 | Gielisch | |
| 2016/0288564 | A1 | 10/2016 | Ishikawa et al. | |
| 2018/0272798 | A1 | 9/2018 | Fauser et al. | |
| 2019/0184736 | A1 | 6/2019 | Groth et al. | |

FOREIGN PATENT DOCUMENTS

| | | |
|---|---|---|
| DE | 10 2011 107 064 A1 | 3/2012 |
| DE | 10 2011 016 535 B3 | 5/2012 |
| DE | 10 2012 107 692 A1 | 2/2014 |
| DE | 11 2012 003 593 T5 | 6/2014 |
| DE | 10 2013 222 044 A1 | 4/2015 |
| DE | 10 2016 003 963 A1 | 9/2016 |
| DE | 10 2016 105 630 A1 | 10/2016 |
| DE | 10 2015 223 386 A1 | 6/2017 |
| DE | 10 2016 216 067 A1 | 3/2018 |
| EP | 3 103 652 A1 | 12/2016 |
| JP | 04002502 A * | 4/1990 |

OTHER PUBLICATIONS

International Search Report (PCT/ISA/210) issued in PCT Application No. PCT/EP2019/052862 dated May 31, 2019 with English translation (eight pages).

German-language Written Opinion (PCT/ISA/237) issued in PCT Application No. PCT/EP2019/052862 dated May 31, 2019 (five pages).

German-language Search Report issued in German Application No. 10 2018 203 801.5 dated Feb. 7, 2019 with partial English translation (13 pages).

* cited by examiner

WHEEL FOR A VEHICLE

BACKGROUND AND SUMMARY OF THE INVENTION

The invention relates to a wheel for a vehicle having a rim, a hub portion and at least two spokes which connect the hub portion to the rim, at least one spoke gap between the spokes being covered at least partially by a covering element.

With respect to the prior art, reference is made by way of example to DE 10 2013 222 044 A1.

A very wide variety of requirements are made of wheels of vehicles, in particular those of passenger cars. In addition to sufficient strength with a low weight, the wheels are to be conducive, in particular, to a satisfactory drag coefficient of the vehicle and are to be distinguished by a pleasing visual appearance. This also includes the fact that the visible outer region of the wheels is contaminated only to a small extent as a result of the abrasion of the wheel brake which is provided on the wheel inner side of the wheels. In order to ensure the latter, in particular, it is known to cover the clearances between all the spokes of a wheel by means of a single disk-shaped covering element, which is provided on the inner side of the wheel, with respect to the brake disk of the wheel brake, which brake disk rotates together with the wheel. In addition, covering elements are also known which cover spoke gaps individually.

Since the brake heats up to an extreme extent, in particular, in the case of braking from high speeds of the vehicle, a brake cooling action is desirable, moreover, by way of an air stream between the wheel exterior through the spoke gaps and the brake.

There is a conflict of objectives between an optimized drag resistance and an optimum brake cooling action.

Here, DE 10 2013 222 044 A1 describes a rim covering for a vehicle wheel for attaching to a vehicle rim with at least one wing element for covering at least one portion of the rim, which wing element can assume at least a first and a second shape in a temperature-dependent manner. Here, the wing element is configured as a multilayer composite consisting of two materials with a different coefficient of thermal expansion.

A multilayer composite of this type with two materials with different coefficients of thermal expansion (bi-material) is a solution to the abovementioned conflict of objectives, but the manufacture of a wing element of this type by way of adhesive bonding and/or mechanical joining of the two materials is complex, expensive and fault-prone.

It is therefore an object of the invention to provide a wheel for a vehicle with an improved covering element.

The object is achieved by way of a wheel for a vehicle with the features of the independent claims. Advantageous embodiments and developments are the subject of the dependent claims.

A wheel for a vehicle is proposed, which wheel comprises a rim, a hub portion and at least two spokes which connect the hub portion to the rim. Here, a spoke gap between the two (in particular, adjacent) spokes is covered at least partially by an at least approximately planar covering element of single-piece configuration.

Furthermore, the single-piece covering element comprises a wing portion which can be deformed into at least a first and a second position in a temperature-dependent manner. Here, under the influence of heat, from a defined limit temperature, an end portion of the wing element is preferably deformed or curved in the axial direction away from the wheel in the installed state of the covering element in the wheel.

If the ambient temperature around the wing portion is therefore situated below a defined limit temperature, for example at a standstill of the vehicle or at low speeds, the wing portion is preferably situated here in a shut or closed state. As a result of repeated braking of a disk brake, in particular, the friction energy which is used to this end is converted to a large extent into heat. After the defined limit temperature is reached in the wheel region and/or in the rim region, at least one end portion of the wing portion is deformed axially away from the wheel, with the result that an opening and therefore an air cooling action of the brake and/or the wheel interior are made possible.

Here, the single-piece covering element is configured from a single composite material.

Here, the covering element is particularly preferably configured from a fiber composite plastic, in particular a carbon fiber composite plastic. Here, a fiber composite covering element of this type is configured from two main components, namely the fibers and a plastic matrix which connects the fibers.

It is provided here that the wing portion is deformed solely by way of the influence of heat (that is to say without the aid of any other energy supplies, such as an actuator) in such a way that, in the installed state on the wheel, it opens at least partially and therefore makes an air stream between the wheel interior and the wheel exterior possible.

Said targeted deformation under the supply of heat, in particular of a deformable end portion of the wing portion, can be realized by way of a suitable layer structure of the fiber composite component.

As has already been mentioned, carbon fibers preferably come into question as fibers of the fiber composite covering element, and a defined epoxy resin system preferably comes into question as matrix. A carbon fiber composite plastic of this type is also called CFRP.

Furthermore, the covering element is preferably constructed from a laminate with individual layers which are layered on one another. In the individual layers, the fibers can be, for example, oriented randomly (for example, in the form of a nonwoven or what are known as SMC pressed mats) or oriented in a defined direction (what are known as unidirectional (UD) layers) or in two or more directions (what are known as multidirectional (MD) layers, for example in the form of meshes or woven fabrics). The orientation of the fibers is decisive for controlling the coefficient of expansion in the case of the input of heat of the material.

The group of laminates utilizes all the advantages of the individual fiber orientation. The laminate is formed from a plurality of semifinished fiber products which are laid above one another (for example, woven fabrics, rovings, mats) or individual layers with different main fiber directions. Individual layers of this type are also called a UD layer (=unidirectional layer).

Here, the covering element or the laminate is particularly preferably formed from a plurality of individual layers which are layered on one another. Here, all of said individual layers do not have to be UD layers, but rather can also be configured as woven fabrics, meshes, knitted fabrics, etc. with different fiber orientations.

Furthermore, it is preferably provided that the covering element has at least one upper laminate layer as viewed in the installed state in the wheel, in the case of which upper laminate layer the fibers are oriented in such a way that it has a symmetrical laminate structure. Here, said upper or outer laminate structure has symmetrical fiber orientations with regard to a center plane (labeled "CP" in FIG. 2) of the upper laminate structure. Therefore, the upper layer structure of the covering element is preferably formed by a plurality of upper individual layers which are layered on one another. As an alternative, the upper layer structure can also be formed by way of one or more multidirectional individual layers (for example, by way of one or more meshes or woven fabrics), which has said symmetrical properties.

The layer structure is determined by way of the required strength and/or rigidity. Here, the textile layers are selected in such a way that the fibers run in the direction, the strength and/or rigidity of which has to be increased. It is to be noted here that the layer structure has to be mirror-inverted in an imaginary center plane or plane of symmetry.

Here, the plane of symmetry of the laminate/layer structure describes that center plane (parallel to the individual layers or to the laminate structure) which divides a laminate structure into two halves of identical thickness.

That is to say, in the case of a symmetrical layer structure, the uppermost layer corresponds in terms of weight per unit area, the fiber type (for example, carbon or glass) and the fiber direction to the lowermost layer (and so forth). In the case of odd-numbered layer structures, the middle layer can as it were be mirror-inverted within itself. Said symmetry is necessary so as not to produce any distortion of the component as a result of the reaction and temperature shrinkage which occurs in the production process of the component and/or a volume change due to the temperature during the service life on the vehicle. In the region of the wing portion, said symmetry is deliberately interrupted by way of a locally applied second laminate layer which lies on the inner side of the wheel as viewed in the installed situation. Said second laminate has a high coefficient of temperature expansion in the circumferential direction with respect to the wheel, and therefore brings about the necessary curvature of the wing portion in the case of heating. This increase in the coefficient of temperature expansion, which increase runs purely in the circumferential direction, is preferably produced primarily in the reinforcing fibers which point in the radial direction of the wheel.

Here, an upper or outer individual layer or an upper or outer laminate structure addresses that layer structure or that side of the covering element which is oriented axially in the direction of the wheel exterior or faces the wheel exterior in the installed state of the covering element.

Here, the layering or the forming of the laminate, for example by way of the individual fiber layers being laid on one another, fundamentally determines the properties of the covering element. This is because different properties can be achieved depending on the direction, in which the fibers of the individual layers are oriented with respect to one another.

Fiber composite materials can be, for example, anisotropic materials, that is to say the properties of the material are different in different spatial directions. This also applies to the coefficient of thermal expansion. Said coefficient defines the length change of a material, in the case of an input of heat. For an individual fiber matrix layer, in the case of which all the fibers run in one direction (that is to say, a UD layer), said factor is considerably lower in the fiber direction than perpendicularly with respect to the fiber. Since the individual layers likewise have the anisotropic properties, the properties of the laminate or the fiber composite flap are dependent on the orientation of the individual layers or their fibers. As a consequence, the resulting thermal expansion of the fiber composite flap is dependent on the sum of the orientations of the fibers of the individual layers. This effect is to be utilized in this invention, in order to bring about opening up or bending open of the wing portion.

Depending on the fiber orientation, a fiber composite component can also, however, have isotropic or quasi-isotropic properties (in particular with regard to the thermal expansion) in the surface direction (not in the thickness direction). It is preferred in this case that only said upper laminate structure of the covering element has an isotropy in the surface direction with regard to the thermal expansion. Here, said isotropy of the upper laminate structure in the surface denotes the independence of a defined property from the direction. In this specific case, in particular, the isotropic property with regard to the thermal expansion of the upper laminate structure is addressed. This means that the upper laminate structure of the covering element preferably behaves in an isotropic or quasi-isotropic manner in the surface direction in the case of the influence of heat, that is to say the upper laminate structure expands in a direction-independent manner in the case of the influence of heat. An expansion in a direction-independent manner means that the upper laminate structure expands equally in every surface direction (that is to say, not in the direction of the thickness of the laminate). Here, the thermal expansion of the upper laminate structure is preferably negligibly small due to the material.

Here, however, the upper laminate structure does not necessarily have to have isotropic properties in the surface direction (that is to say, have identical strength characteristic values, coefficients of thermal expansion, etc. in all directions). A composite material can increase or decrease in size to a different extent in different directions virtually without distortion in the case of a temperature. In the case of the use of carbon fibers, in particular, the length change is very low in the fiber direction, and is comparatively great transversely with respect to the fiber direction, such that the properties are determined here by the matrix. The primarily used matrix systems are plastics which, as is known, have a relatively high coefficient of thermal expansion. The layering of the lower laminate layer of the wing element consists primarily of a unidirectional structure (UD), in the case of which the fibers run in the radial direction. This leads to the coefficient of thermal expansion being much higher in the circumferential direction than that of the upper laminate layer. This leads to the desired bending open of the wing portion in the case of heating. The height of the bend open can be changed by way of the material selection of the laminate thickness, the fiber volume content and the fiber direction.

A low or negligibly small thermal expansion of this type and a quasi-isotropic or isotropic property of this type and/or a distortion-free expansion (that is to say, no deformation or curvature takes place) of the upper layer structure in its surface can be achieved by way of a defined fiber orientation of the individual layers and/or the woven fabrics.

As has already been mentioned, it is preferably provided here that the fibers which form the upper laminate structure are arranged symmetrically about a center plane.

As viewed from said center plane, it is then preferred that the individual layers or the fibers of the upper individual layers are arranged in a mirror-inverted manner (as viewed with respect to the center plane) with respect to one another.

The upper laminate structure is preferably not only of symmetrical construction, but rather also has fibers in primarily four directions (0°, +45°, −45° and 90°), which imparts quasi-isotropic properties in the plane to said structure.

Accordingly, in the case of an input of heat, the upper laminate structure expands approximately homogeneously in all directions on account of a fiber orientation, and to a relatively small extent with respect to a UD-dominated layer structure which is situated, for example, in the lower laminate of the wing portion.

In order, however, that said wing portion opens up in the case of an input of heat and the vehicle brake can therefore be cooled, said wing portion is preferably to be thickened in addition to the upper laminate structure by at least one further lower individual layer. The fiber direction of said layer is selected in such a way that a coefficient of thermal expansion which is as high as possible is achieved in the wheel circumferential direction.

This ensures the necessary deflection of the ventilator element.

Here, the wing portion is preferably formed by virtue of the fact that the covering element is cut at the points, at which the wing portion is provided, with the result that, in the case of the input of heat, at least one part of the wing portion is released from the rest of the covering element in such a way that said part can move axially away from the wheel and the wing portion of the covering element produces an open state.

Here, the cut for releasing the wing portion from the rest of the covering element in a foldable manner can take place during the production method of the covering element, and will be described in more precise detail further below.

Furthermore, it is preferably provided here that, in contrast to the rest of the covering element, the wing portion has two regions in the layer structure, which regions have extremely different coefficients of thermal expansion in one direction. As has already been mentioned above, this property can be achieved by way of a corresponding fiber orientation of the individual layers of the laminate structure or by way of an additional laminate.

To this end, it is preferably provided that the wing portion comprises a lower or an inner laminate structure which is arranged exclusively in the region of the wing portion and is oriented in the direction of the wheel interior in the installed state of the vehicle.

To this end, the wing portion is preferably of asymmetrical configuration per se, that is to say the inner or lower laminate structure here, together with the upper laminate structure, is of asymmetrical configuration per se, with regard to a center plane of the wing element (that is to say, said two laminate structures together).

Here, as has already been mentioned, the center plane or the plane of symmetry of the wing portion describes that center plane (parallel to the individual layers or to the laminate structure) which divides the laminate structure of the wing portion into two halves (preferably of identical thickness).

Here, the lower or inner laminate structure is arranged only in the wing portion. Preferably here, as has already been mentioned, the fibers of the individual layers of the lower laminate structure are particularly preferably configured at least approximately in the radial direction of the wheel in the installed state of the covering element. If the lower laminate structure is constructed here by way of unidirectional individual layers, the fibers are configured in each case parallel to one another and at least approximately in the radial direction of the wheel. Here, at least approximately in the radial direction is to be understood to mean that a fiber is configured in the radial direction of the wheel.

The fibers of the upper laminate structure are preferably oriented in a different direction than the fibers of the lower laminate structure.

Therefore, the entire laminate structure of the wing portion is of asymmetrical configuration per se. As a result of an additional arrangement of the fibers of the lower laminate structure in the radial direction of the wheel, the lower laminate structure expands (at least approximately) perpendicularly with respect to the fiber direction in the case of an input of heat, that is to say at least approximately in the circumferential direction of the wheel. Here, the upper laminate structure does not also expand significantly (in the surface direction), for which reason the wing portion is deformed in the axial direction away from the wheel (that is to say, in the direction of the wheel exterior).

Furthermore, it is provided in one preferred embodiment of the invention that, at least on the edge regions which adjoin the spokes, the covering element has a limb which projects at least approximately in the axial direction of the wheel from the flat covering element. Here, the limb preferably at the same time forms the contact face of the covering element with the spokes which are connected to it. The limb therefore preferably lies on a spoke face which extends in the radial direction of the wheel.

A limb of this type can likewise already be configured in the production method of the covering element, and will be described in more accurate detail further below. Here, the limb is formed, as it were, by way of a bend of the flat covering element axially in the direction of the wheel interior.

The at least two limbs (in each case bearing against a spoke) are preferably of flexible configuration in the circumferential direction of the wheel. As a result of a flexible configuration of the limbs, they act like a spring and clamp the covering element against the two spokes in the circumferential direction of the wheel.

In order that the covering element is also fastened axially to the wheel or to the spokes, it is preferably provided, furthermore, that said limbs of the covering element have an undercut at their ends or on their edges, which undercut can be clamped or hooked into a spoke edge which is oriented in the direction of the wheel interior.

In addition to said undercut, it is preferred that a latching lug is arranged on said undercut or on said edge of the limbs, which latching lug makes latching into the respective spoke edge and therefore fixed and captive axial fixing of the covering element to the wheel possible. The latching lug can then be applied to the covering element or to the limbs, for example, subsequently in the case of a machining operation.

An abovementioned subsequent machining operation of the limb ends of the covering element can lead to the fibers, in particular carbon fibers, which are arranged in the covering element being exposed and therefore bearing directly against the material of the spoke. In order to avoid corrosion between a metal spoke and the fibers (in particular, the carbon fibers), it is therefore preferably provided that the undercut or the limb of the covering element is coated with a plastic layer or a suitable varnish, with the result that the fibers do not pass directly into contact with the spoke material.

Furthermore, a method for producing a covering element for a wheel of a vehicle is now proposed, which covering element is configured according to the above aspects.

In one preferred embodiment of the invention, the covering element is preferably to be produced in a pressing method, in particular in what is known as a wet pressing method or a combined SMC wet pressing method.

In the case of a preferred wet pressing method, liquid reaction resins or else other plastics in liquid form are processed together with reinforcing fibers in two-piece molds (that is to say, for example, an upper and a lower mold half). The upper and the lower mold half are closed by means of a press.

The resin or the plastic is usually cast onto the fiber mats centrally or in accordance with a fixed casting plan in the case of the wet pressing process. Epoxy resins, polyurethane resins, vinylester resins or polyamide resins are usually used which are mixed from two or more components to form a reactive liquid plastic. A slot die or other distributor systems are frequently used for the full surface application on the fiber mats or the individual layers which are laid on one another or on the layer stack (also thus referred to as so-called stacks or partial layer stacks). The plastic is distributed by way of the closing operation of the mold under the pressure of the press in the entire mold cavity, and wets the reinforcing fibers. Afterward, the curing of the plastic/resin takes place, usually at an elevated temperature. When the plastic is cured, there is dimensional stability of the component, and the latter can be demolded after opening of the mold.

As an alternative to said wet pressing method, the covering element can also be produced in another suitable method for producing a fiber composite component. For example, further production methods which are known from the prior art for fiber composite plastics are also suitable, such as what is known as a resin transfer molding method (RTM method for short), a sheet molding compound method (SMC method for short) or a bulk molding compound method (BMC method for short) for the production of the covering element. In the case of the SMC method, for example, it is possible to integrate the preferred latching lug of the edge of the covering element into the covering element directly during the production method.

Here, the wet pressing process which is now described in the following text takes place under the influence of heat, the temperature of the mold corresponding here approximately to the operating temperature of the wheel region, which operating temperature transfers the covering element into an open state. Here, the wing portion can be manufactured in the mold in said deflection which it will also assume at said temperature in the ventilator position during later operation.

In a very first step, the upper and the lower stack (that is to say, that stack which forms the lower laminate structure) are preferably wetted over the full surface area with resin, that is to say the plastic matrix. Subsequently, the stack is inserted at the desired point flatly into the lower mold. Here, the point or the region is at that location which is cut to form the wing portion in the subsequent course of the production process. Accordingly, said lower stack or said lower individual layers is/are already cut in the shape of the wing portion which is subsequently produced. The lower individual layers or the lower stack are/is then preferably inserted in such a way that their fibers of the covering element which is subsequently installed in the wheel are oriented in the radial direction of the wheel.

Following the insertion of the lower individual layers or the lower laminate structure or the lower stack into the lower mold, the upper individual layers or woven fabrics or meshes or the upper stack are/is inserted into the lower mold. After the insertion of the upper individual layers or the upper stack, the lower individual layers or the lower stack which already lie/lies in the lower mold and upper individual layers which lie above are therefore situated at that point, at which the wing portion is subsequently cut. The remaining part of the lower mold (that is to say, the part which does not subsequently become part of the wing portion) is covered merely by way of the upper individual layers or the upper stack.

In a next step, the pressing mold closes. Afterward, the lateral slides move into the pressing mold and shape the latching lugs. At the same time or else shortly afterward, the slide for configuring the wing portion then moves vertically upward out of the lower mold in the direction of the upper mold half, and therefore presses the lower laminate from below onto the upper laminate and in turn presses the latter onto the upper mold half. Here, the geometry of that surface of the first slide which presses the laminate in the direction of the upper mold half corresponds to the geometry or the shape of the wing portion.

In said step, the slide cuts the wing portion along its edges. At the same time, the slide joins the laminate by way of the resin to form a fiber composite component.

In order that the component is of planar configuration per se at a subsequent room temperature (that is to say, at approximately 20°), and the wing portion does not fold open or produce an open state at room temperature (but rather produces a closed state), the first slide already deforms the wing portion into the desired folded-open shape. Since the operating temperature of the pressing apparatus and therefore the operating temperature in the pressing mold namely correspond approximately to the operating temperature of the wheel region, at which the wing portion is to produce an open state, it is preferred that the wing portion already produces the desired open shape in the mold at said temperatures.

The covering element is pressed by way of the slides and the mold halves which lie on one another under the influence of heat, and the individual layers are connected to one another by way of the resin. After curing of the finished fiber composite covering element, the mold halves open again, and the finished covering element can be removed. The component is primarily removed horizontally, in the direction of the subsequent wheel center.

In a subsequent machining method, said bevel or latching lug can then be applied to the undercut edge of the limbs of the covering element.

The specified fiber composite covering element makes satisfactory covering of the wheel possible in order to reduce the drag resistance with simultaneous enabling of brake cooling. No additional actuators at all are required to open and close the covering element. Furthermore, the covering element can be manufactured simply and can be mounted simply on the wheel as a result of its single-piece nature and as a result of a homogeneous material. Furthermore, the covering element saves weight and cost as a result of a configuration from a fiber composite plastic.

As well as from the claims and from the description, these and further features are also apparent from the drawings, the individual features being implemented in each case per se on their own or in a multiple manner in the form of subcombinations in the case of one embodiment of the invention, and can produce embodiments which are advantageous and patentable per se, protection for said embodiments being claimed here.

In the following text, the invention will be described in further detail on the basis of one exemplary embodiment. Here, all the features which are described in greater detail can be essential to the invention.

DETAILED DESCRIPTION OF THE DRAWINGS

Figure 1:
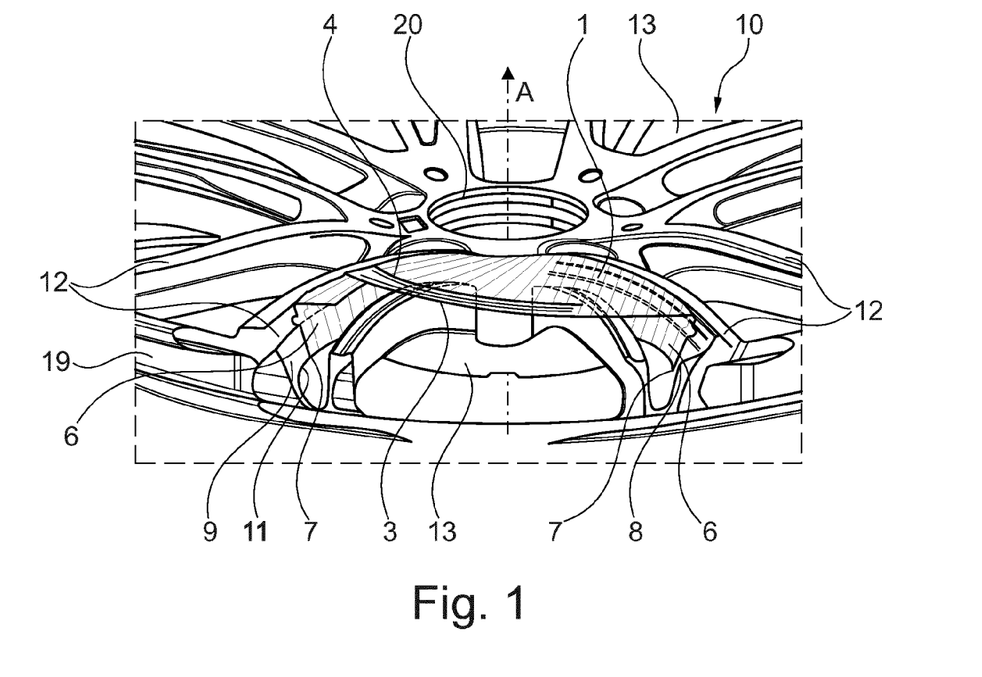
FIG. 1 shows a part of a wheel for a vehicle, in which a covering element is arranged, by way of example in a three-dimensional view from the outside of the wheel.

A part of a wheel 10 for a vehicle can be seen in a three-dimensional view of the wheel exterior in FIG. 1. Here, the wheel 10 comprises a rim 19, a hub section 20, and a plurality of spokes 12 which connect the hub section 20 to the rim 19. A covering element 1 is arranged in a spoke gap 13 between the spokes 12. Here, the covering element 1 is configured from a fiber composite plastic, and has a wing portion 3 which can be deformed into a folded-open state in the case of the influence of heat. Here, FIG. 1 shows the wing portion 3 in an open state. Furthermore, the wheel portion, in which the covering element 1 is arranged, is shown in a cut-away view (or cross-sectional view in the axial direction of the wheel) for improved illustrative purposes.

In order to attach the covering element 1 to the wheel 10, the covering element 1 comprises two limbs 6 which run in the axial direction A of the wheel in the direction of the wheel interior and bear flatly against the spoke faces 9 of two spokes 12. Furthermore, the limbs 6 have an undercut 7 for attaching or for hooking the limbs 6 into a spoke edge 11 of the wheel 10.

In order to attach the covering element 1 to the spokes 12 of a wheel 10 for a vehicle, it is provided that the limbs 6 bear in each case against a surface of the spokes 12 which runs in the axial direction of the wheel, and clamp the covering element 1 into the spoke gap 13 in an analogous manner to a spring function. Here, the limbs 6 are of elastic configuration due to the material, in such a way that they can carry out a spring function of this type.

A bevel or a latching lug 8 is likewise provided on the edges of the limbs 6 for latching and therefore for fixing the covering element 1 on the spoke edges 11 of a wheel 10.

Figure 2:
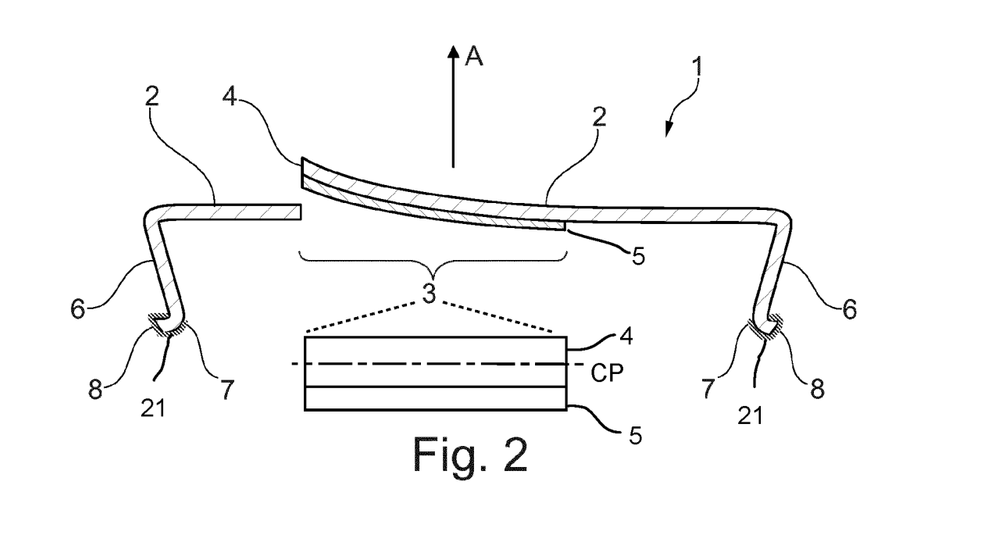
FIG. 2 shows a diagrammatic cross section through the covering element from FIG. 1.

FIG. 2 shows a cross section through a covering element 1 in a diagrammatic view. Here, in particular, the laminate structure of the covering element 1 is to be indicated. Here, the covering element 1 is formed by way of a continuous upper laminate structure 2. Here, the upper laminate structure 2 is formed from individual layers which are layered on one another and are connected to one another by way of a resin. Here, the fibers of the individual layers are oriented in such a way that the upper laminate structure 2 which is mirror-inverted within itself therefore experiences merely a size change but no dimensional change (in particular, no bending) in the case of a temperature change. Here, the upper laminate structure does not necessarily have to have isotropic properties (that is to say, identical strength characteristic values, coefficients of thermal expansion, etc. in all directions). A composite material can increase or decrease in size to a differing extent in various directions virtually without distortion at a temperature. In the case of the use of carbon fibers, in particular, the length change is very small in the fiber direction, and is comparatively great transversely with respect to the fiber direction, with the result that the properties here are determined by the matrix. The primarily used matrix systems are plastics which, as is known, have a relatively high coefficient of thermal expansion. The layering of the lower laminate layer of the wing element consists primarily of a unidirectional construction (UD), in the case of which the fibers run in the radial direction. This leads to the coefficient of thermal expansion being much higher in the circumferential direction (in the viewing direction of the axial line, this is at 90° with respect to the radial direction) than that of the upper laminate layer. In the case of heating, this leads to the desired bending open of the wing portion. The size of the bend can be changed by way of the material selection of the laminate thickness, the fiber volume content and the fiber direction.

The wing portion 3 of the covering element 1 can likewise be seen in FIG. 2. Here, in particular, the cut 4 through the covering element 1 can be seen, which cut 4 has been made in the covering element 1 during the production process and forms the wing portion 3.

Furthermore, it is provided that, in contrast to the rest of the covering element 1, the wing portion 3 comprises two laminates with greatly different coefficients of thermal expansion in the circumferential direction of the installed covering element. To this end, in addition to the upper laminate structure 2, the wing portion 3 is provided with a lower laminate structure 5 which, as it were, locally thickens the wing portion 3 and is configured in terms of its fiber orientation in such a way that, in the case of the input of heat, the wing portion 3 folds open into the depicted position or is deformed into the depicted open position.

Here, said lower laminate structure is preferably situated in the installed state on a side of the covering element, which side faces the wheel interior, as can be seen in FIG. 1.

Here, the lower laminate structure 5 is formed primarily from a plurality of individual layers of unidirectional fiber layers.

Here, the individual layers or the fibers of the individual layers of the lower laminate structure 5 are arranged with respect to those of the upper laminate structure 2 in such a way that the wing portion 3 has a greater coefficient of thermal expansion in the circumferential direction toward the wheel interior than the upper layer structure 2. A laminate structure of this type of the wing portion 3 then has properties with regard to the thermal expansion which are such that, in the case of the input of heat, the wing portion 3 is deformed in a defined direction.

In order that the wing portion 3 folds open in the axial direction away from the wheel in the installed state of the covering element 1, as shown in FIG. 2, the fibers of the lower laminate structure 5 are oriented at least approximately in the radial direction of the wheel. In the case of the supply of heat, the lower laminate structure 5 expands at least approximately in the circumferential direction of the wheel. The upper laminate structure 2 which is arranged on the outer side as viewed in the installed state of the covering element 1 expands to a comparatively small extent, and therefore counteracts the expansion of the lower laminate structure 5 with a resistance. The wing portion 3 is then deformed axially away in the direction of the wheel outer side.

As can be seen in FIG. 1, in particular, the lower laminate structure 5 is arranged here on the covering element 1 in such a way that it is oriented in the direction of the wheel interior.

Figure 3:
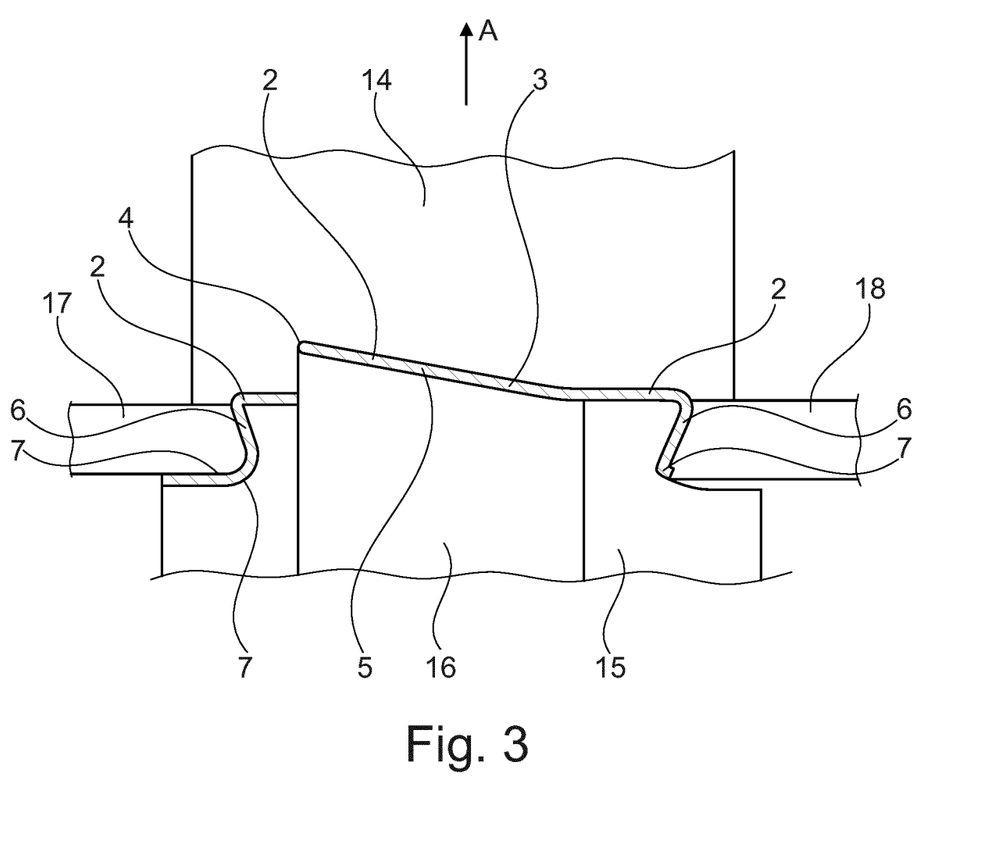
FIG. 3 shows the covering element in a mold of a pressing apparatus in a cross-sectional illustration.

FIG. 3 shows the covering element 1 in an exemplary mold of a wet pressing system in a cross-sectional view. Here, the laminate structure of the covering element 1 can be seen, which laminate structure is pressed in between an upper and lower mold half 14, 15.

Here, a first slide 16 is extended from the lower mold half 15 vertically in the direction of the upper mold half 14. Here, said first slide 16 brings about the cut of the wing portion 3 of the covering element 1 and the folded-open shape of the wing portion 3.

Two horizontal slides 17, 18 can likewise be seen which shape the two limbs 6 of the covering element 1 during the wet pressing method.

LIST OF DESIGNATIONS:

1 Covering element
2 Upper layer structure
3 Wing portion
4 Cut
5 Lower layer structure
6 Limb
7 Undercut
8 Latching lug
9 Spoke face
10 Wheel
11 Spoke edge
12 Spoke
13 Spoke gap
14 Upper mold half
15 Lower mold half
16 Slide
17 Horizontal slide
18 Horizontal slide
19 Rim
20 Hub portion
A Axial direction
21 Plastic coating

What is claimed is:

1. A wheel of a vehicle, comprising:
a rim;
a hub portion;
at least two spokes which connect the hub portion to the rim;
a covering element by which at least one spoke gap between the spokes is covered at least partially by the covering element, wherein
the covering element is a single-piece having a wing portion that deforms axially away from a remainder of the covering element and the wheel when heat is supplied, wherein a cut in the covering element separates the wing portion and the remainder of the covering element,
the covering element is connected directly to the wheel, and
the single-piece covering element is configured from a single composite material.

2. The wheel according to claim 1, wherein
the covering element is configured from a fiber composite plastic with a matrix material and fibers which are embedded in the matrix material, and
the covering element is formed from a laminate having a plurality of individual layers which are layered on one another.

3. The wheel according to claim 2, wherein
the covering element has at least one uppermost individual layer, in the case of which the fibers are arranged such that an upper symmetrical laminate structure is configured as viewed with regard to a center plane of the individual layer.

4. The wheel according to claim 3, wherein
the upper laminate structure is formed by way of a plurality of unidirectional individual layers which are layered on one another, and has a symmetrical layer structure as viewed with regard to a center plane of the upper laminate structure.

5. The wheel according to claim 3, wherein
the upper laminate structure is formed by way of at least one multidirectional individual layer, and has a symmetrical layer structure as viewed with regard to a center plane of the upper laminate structure.

6. The wheel according to claim 3, wherein
the wing portion has an asymmetrical layer structure as viewed with regard to a center plane of the wing portion, and
the layer structure of the wing portion is formed by way of the upper laminate structure and at least one additional lower individual layer, the fibers of which are oriented at least approximately in the radial direction of the wheel as viewed in the installed state of the covering element.

7. The wheel according to claim 1, wherein
the covering element in each case comprises, at least on edge regions which adjoin the spokes, a limb which projects at least approximately in an axial direction of the wheel from the covering element and is of flexible configuration.

8. The wheel according to claim 7, wherein
the limb has an undercut on an edge, which undercut when installed is hooked into a spoke edge which faces the vehicle.

9. The wheel according to claim 8, wherein
the undercut comprises a latching lug for latching into a spoke edge.

10. The wheel according to claim 9, wherein
the undercut and/or the latching lug is coated with a plastic material.

11. A wheel of a vehicle, comprising:
a rim;
a hub portion;
at least two spokes which connect the hub portion to the rim;
a covering element by which at least one spoke gap between the spokes is covered at least partially by the covering element, wherein
the covering element is a single-piece having a wing portion that deforms axially away from the wheel when heat is supplied,
the covering element is connected directly to the wheel,
the single-piece covering element is configured from a single composite material,
the covering element is configured from a fiber composite plastic with a matrix material and fibers which are embedded in the matrix material,
the covering element is formed from a laminate having a plurality of individual layers which are layered on one another,
the covering element has at least one uppermost individual layer, in the case of which the fibers are arranged such that an upper symmetrical laminate structure is configured as viewed with regard to a center plane of the individual layer, and
the upper laminate structure is formed by way of at least one multidirectional individual layer, and has a symmetrical layer structure as viewed with regard to a center plane of the upper laminate structure.

12. A wheel of a vehicle, comprising:
a rim;
a hub portion;
at least two spokes which connect the hub portion to the rim;
a covering element by which at least one spoke gap between the spokes is covered at least partially by the covering element, wherein the covering element is a single-piece having a wing portion that deforms axially away from the wheel when heat is supplied, the covering element is connected directly to the wheel, the single-piece covering element is configured from a single composite material, the covering element is configured from a fiber composite plastic with a matrix material and fibers which are embedded in the matrix material, the covering element is formed from a laminate having a plurality of individual layers which are layered on one another, the covering element has at least one uppermost individual layer, in the case of which the fibers are arranged such that an upper symmetrical laminate structure is configured as viewed with regard to a center plane of the individual layer, the wing portion has an asymmetrical layer structure as viewed with regard to a center plane of the wing portion, and the layer structure of the wing portion is formed by way of the upper laminate structure and at least one additional lower individual layer, the fibers of which are oriented at least approximately in the radial direction of the wheel as viewed in the installed state of the covering element.

* * * * *